US010985827B2

United States Patent
Zhou et al.

(10) Patent No.: US 10,985,827 B2
(45) Date of Patent: Apr. 20, 2021

(54) PRIORITIZING RECEPTION OF PDCCH FOR BEAM FAILURE RECOVERY

(71) Applicant: QUALCOMM Incorporated, San Diego, CA (US)

(72) Inventors: Yan Zhou, San Diego, CA (US); Tao Luo, San Diego, CA (US); Heechoon Lee, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/600,402

(22) Filed: Oct. 11, 2019

(65) Prior Publication Data

US 2020/0145081 A1 May 7, 2020

Related U.S. Application Data

(60) Provisional application No. 62/754,501, filed on Nov. 1, 2018.

(51) Int. Cl.
*H04B 7/06* (2006.01)
*H04W 48/16* (2009.01)
(Continued)

(52) U.S. Cl.
CPC .......... *H04B 7/0695* (2013.01); *H04B 7/068* (2013.01); *H04B 7/0617* (2013.01);
(Continued)

(58) Field of Classification Search
CPC .... H04B 7/0695; H04B 7/068; H04B 7/0617; H04W 48/16; H04W 72/046
(Continued)

(56) References Cited

U.S. PATENT DOCUMENTS

2019/0306924 A1* 10/2019 Zhang ................... H04L 5/0051
2019/0349061 A1* 11/2019 Cirik ..................... H04L 1/1858

OTHER PUBLICATIONS

"3rd Generation Partnership Project: Technical Specification Group Radio Access Network, NR, Radio Resource Control (RRC) Protocol Specification (Release 15)", 3GPP Standard, Technical Specification, 3GPP TS 38.331, 3rd Generation Partnership Project (3GPP), Mobile Competence Centre, 650, Route Des Lucioles, F-06921, Sophia-Antipolis Cedex, France, vol. RAN WG1, No. V15.2.1, Jun. 21, 2018 (Jun. 21, 2018), pp. 1-303, XP051473085, [retrieved on 2018-86-21], p. 82.

(Continued)

*Primary Examiner* — Kevin M Burd
(74) *Attorney, Agent, or Firm* — Arent Fox LLP

(57) ABSTRACT

Search space-BFR time occasions may overlap with other search space occasions. Additionally, if any CORESET other than a CORESET-BFR has lowest CORESET ID, the UE will prioritize receiving that CORESET and may miss the BFR response. Accordingly, assigning a priority to CORESETs or search spaces during BFR may be preferable. In an aspect of the disclosure, a method, a computer-readable medium, and an apparatus are provided. The apparatus may allocate a set of time-frequency resources to a plurality of CORESETs or a plurality of search spaces. The apparatus may assign a priority to each of the plurality of CORESETs or the plurality of search spaces. The apparatus may assign a highest priority to a CORESET for BFR or a search space for BFR.

26 Claims, 7 Drawing Sheets

(51) Int. Cl.
 H04W 72/04 (2009.01)
 H04W 72/10 (2009.01)
(52) U.S. Cl.
 CPC ......... *H04W 48/16* (2013.01); *H04W 72/046* (2013.01); *H04W 72/10* (2013.01)
(58) Field of Classification Search
 USPC .......................................................... 375/267
 See application file for complete search history.

(56) References Cited

OTHER PUBLICATIONS

International Search Report and Written Opinion—PCT/US2019/056118—ISA/EPO—dated Jan. 24, 2020.

LG Electronics: "Remaining Issues on PDCCH Structure", 3GPP Draft, 3GPP TSG RAN WG1 Meeting #93, R1-1806615, 3rd Generation Partnership Project (3GPP), Mobile Competence Centre, 650, Route Des Lucioles, F-06921 Sophia-Antipolis Cedex, France, vol. RAN WG1, No. Busan, Korea, 20180521-20180525, May 20, 2018 (May 20, 2018), pp. 1-4, XP051441817, Retrieved from the Internet: URL: http://www.3gpp.org/ftp/Meetings%5F3GPP%5FSYNC/RAN1/Docs/ [retrieved on May 20, 2018] section 2.1, proposal 1, last paragraph,section 2.2.

Vivo: "Remaining Issues on Physical Downlink Control Channel," 3GPP Draft, 3GPP TSG RAN WG1 Meeting #94bis, R1-1810369, 3rd Generation Partnership Project (3GPP), Mobile Competence Centre, 650, Route Des Lucioles, F-06921, Sophia-Antipolis Cedex, France, vol. RAN WG1, No. Chengdu, China, 20181008-20181012, Sep. 29, 2018 (Sep. 29, 2018), XP051517778, 6 pages, Retrieved from the Internet: URL: http://www.3gpp.org/ftp/tsg%5Fran/WG1%5FRL1/TSGR1%5F94b/Docs/R1%2D1810369%2Ezip [retrieved on Sep. 29, 2018] sections 2 and 4.1.

\* cited by examiner

PRIORITIZING RECEPTION OF PDCCH FOR BEAM FAILURE RECOVERY

CROSS REFERENCE TO RELATED APPLICATION(S)

This application claims the benefit of U.S. Provisional Application Ser. No. 62/754,501, entitled "Prioritizing Reception of PDCCH for Beam Failure Recovery" and filed on Nov. 1, 2018, which is expressly incorporated by reference herein in its entirety.

BACKGROUND

Technical Field

The present disclosure relates generally to communication systems, and more particularly, to beam failure recovery.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet-of-Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Communication systems may utilize beamforming. When search spaces comprising control resource sets (CORESETs) for different beams, a UE may need to select between the overlapping search spaces or CORESETs. A beam failure may occur when a signal quality of a particular beam between, for example, a base station and a UE, is less than a threshold for a specific period of time. After a beam failure occurs, a beam failure recovery may take place. In an aspect, time occasions for a BFR search space may overlap with another previously configured search space (SS) occasion, e.g., both search spaces may overlap in a first symbol of a slot. Selection between the overlapping search spaces may cause a UE to miss a beam failure recovery (BFR) response. Aspects presented herein provide a solution that enables the UE to avoid missing a BFR response due to overlapping search spaces or CORESETs.

In an aspect of the disclosure, a method, a computer-readable medium, and an apparatus are provided. The apparatus may be a base station configured to allocate a set of time-frequency resources to a plurality of a CORESETs or a plurality of search spaces. The apparatus may also be configured to assign a priority to each of the plurality of CORESETs and/or the plurality of search spaces. Additionally, the apparatus may be configured to assign a highest priority to a CORESET for BFR or a search space for BFR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
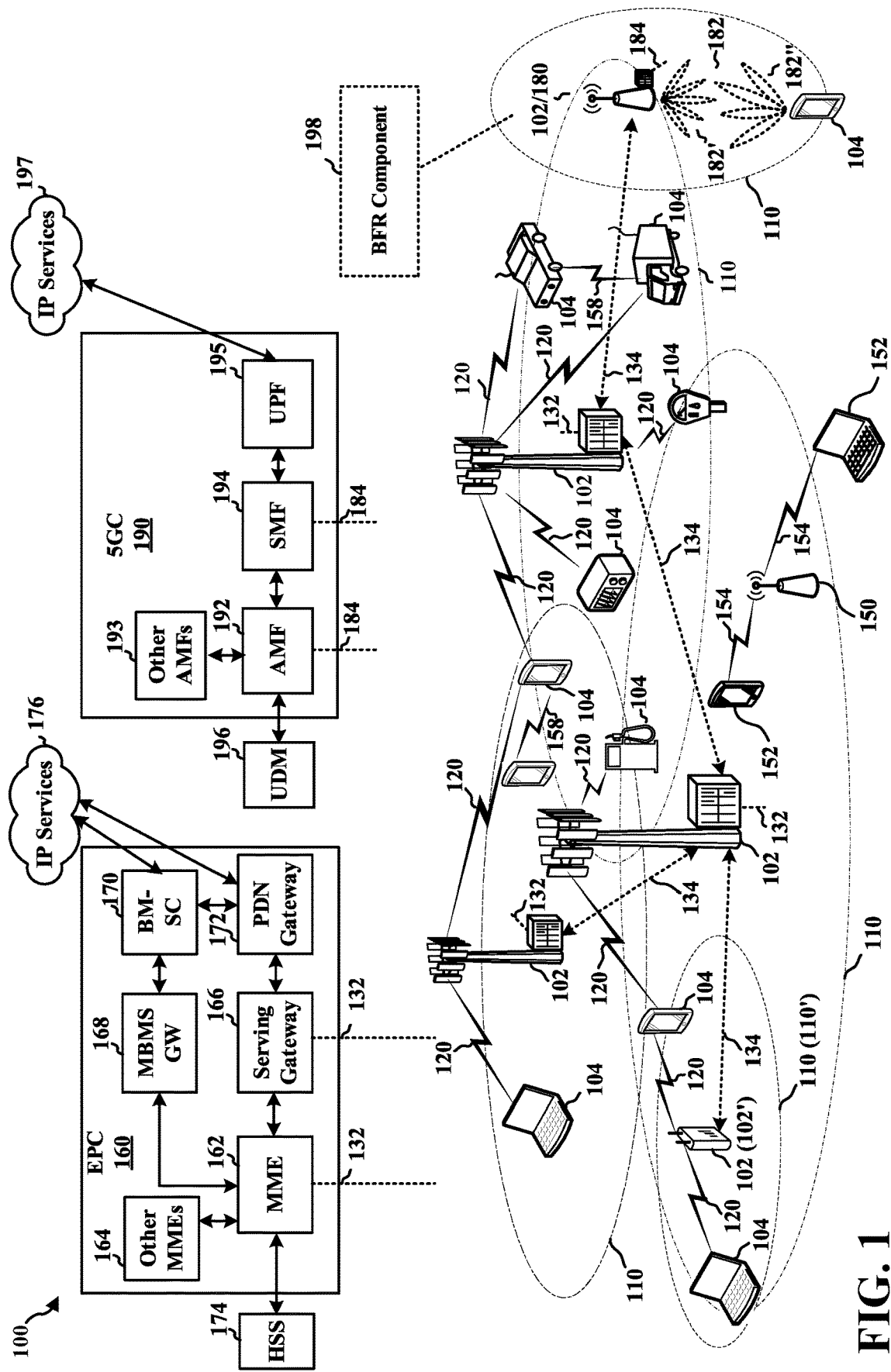
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a core network 190 (such as a 5G Core (5GC)). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell), and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The base station 180, e.g., a mmW base station, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a BFR component 198 configured to assign a highest priority to a CORESET for BFR or a search space for BFR. The base station may be configured to allocate a set of time-frequency resources to a plurality of a CORESETs or a plurality of search spaces. The base station may be configured to assign a priority to each of the plurality of CORESETs or the plurality of search spaces. The priority may be assigned based on an index number assigned to the CORESET(s) and/or search spaces. For example, a lowest number index may be reserved for a CORESET or search space for BFR.

As described herein, communication systems may utilize beamforming 182. For example, a base station 102/180 may utilize beamforming 182 in communication with a UE 104. (The UE 104 may also utilize beamforming in communication with the base station 102/180.) Beamforming 182 is a technique of signal processing used for directional signal transmission or directional signal reception, e.g., in transmit/receive directions 182', 182". Directional signal transmission or directional signal reception may be achieved by using an antenna array to combining signals in such a way that signals at particular angles experience constructive interference, e.g., in a particular transmit/receive directions 182', 182", while signals at other angles experience destructive interference. Accordingly, signals in the direction of the beam, e.g., in transmit/receive directions 182', 182", may experience constructive interference such that transmitted power is directed in a particular chosen direction within a beam while generally much less transmitted power is sent in other directions.

Beamforming 182 may be used for both transmitting signals and receiving signals. Thus, a transmitting device, e.g., base station 102/180 or UE 104, may include an array of antennas used to form a transmitted beam that may be directed in a particular range of angles, e.g., transmit or receive directions 182', 182", from the transmitting device and directed to the receiving device, e.g., UE 104, base station 102/182. Similarly, the receiving device, e.g., UE 104 or base station 102/182, may include an array of antennas used to form a directional receive beam that may be directed in a particular range of angles, e.g., transmit or receive directions 182', 182", from the receiving device, e.g., UE 104 or base station 102/182, and directed to the transmitting device, e.g., base station 102/182 or UE 104.

The beamforming 182 may provide spatial selectivity. Spatial selectivity may be an ability for a device to transmit or receive signals to or from other devices within range and within a set of angles forming the beam from the device. For example, a UE 104 in a particular area may be at a particular angle from a base station 102/108. The UE 104 in the particular area may use a particular beam, e.g., transmit/receive directions 182', 182", that may include a certain range of angles that may experience constructive interference to receive signals within a range of the base station 102/180 that are in the particular range of angles from the base station 102/180 that forms the beam. Similarly, the base station 102/108 transmitting to the UE 104 may use a particular beam that may include a certain range of angles that may experience constructive interference to the transmitted signals to transmit the signals to the UE 104 within range of the base station 102/180 that are in the particular range of angles from the base station 102/180 that forms the beam. The reduced transmit and receive angles may allow multiple devices, e.g., base stations 102/180, UEs 104, to share frequencies because multiple transmissions having the same frequency may be separated from each other by using separate beams. Additionally, the range of signals may be increased because more power may be directed in a particular direction along the beam using constructive interference.

A beam failure may occur when a signal quality of a particular beam between, for example, a base station 102/180 and a UE 104, is less than a threshold for a specific period of time. In some cases, signal quality may degrade rapidly, and there may not be enough time to switch beams being used for communication between the base station 102/180 and the UE 104, and consequently, beam failure may occur. Signal quality may be based on a received signal strength, signal-to-noise ratio (SNR), signal-to-interference-plus-noise ratio (SINK), signal-to-interference ratio (SIR), bit error rate (BER), or other measures used to indicate signal quality in electronic communication systems. For example, a beam failure may occur when SNR of a signal on a beam being used for transmissions between the base station 102/180 and the UE 104 is less than a threshold for a specific period of time or when the BER is higher than a threshold for a specific period of time.

After a beam failure occurs, a beam failure recovery may take place. The beam failure recover may be a mechanism to recover from beam failure. The beam failure recovery may include switching to beam failure recovery resources, such as an alternate beam, and performing one or more transmissions in an attempt to reestablish communication between the base station 102/180 and the UE 104. For example, the base station 102/180 may transmit to the UE 104 in an attempt to reestablish communication between the UE 104 and the base station 102/180. The transmissions between the base station 102/180 and the UE 104 may include a physical downlink control channel (PDCCH) transmissions in a PDCCH search space. The PDCCH search space refers to the area in the downlink resource grid where PDCCH may be carried. A UE 104 may perform blind decoding throughout these search space trying to find PDCCH data. The transmissions between the base station and the UE may include control resource sets (CORESETs) transmissions. The CORESET may be made up of multiples resource blocks (e.g., multiples of 12 REs) in the frequency domain and 1 or 2 or 3 OFDM symbols in time domain. The CORESET may be equivalent to the control region in an LTE subframe.

In some aspects, search space-BFR time occasions may overlap with another previously configured SS occasion, e.g., both search spaces may happen in a first symbol of a slot. Furthermore, based on the CORESET prioritization agreement, if any CORESET other than control resource set failure recovery (CORESET-BFR) has lowest CORESET ID, the UE 104 will prioritize receiving that CORESET and, hence, may miss the BFR response. Accordingly, it may be preferable to assign a priority to each of the plurality of CORESETs or the plurality of search spaces during BFR.

In an aspect of the disclosure, a method, a computer-readable medium, and an apparatus are provided. The apparatus may be a base station configured to allocate a set of time-frequency resources to a plurality of CORESETs or a plurality of search spaces. The apparatus may also be configured to assign a priority to each of the plurality of CORESETs or the plurality of search spaces. Additionally, the apparatus may be configured to assign a highest priority to a CORESET for BFR or a search space for BFR.

Different CORESETs or search spaces may be associated with different beams, antenna ports, or the like so that when a specific beam or antenna port is inactive, the UE 604 does not monitor the corresponding CORESET or search space. A UE may receive a configuration indicating a CORESET or search space corresponding to additional antenna port(s) or the additional beam(s). The UE may then monitor, e.g., at 1122, for a control channel based on the configuration for the CORESET of, the search space and using the additional antenna port(s)/beam(s). Thus, the base station may configure or activate CORESET/search space sets whose QCL states are related to additional links activated at the UE.

Figure 2B:
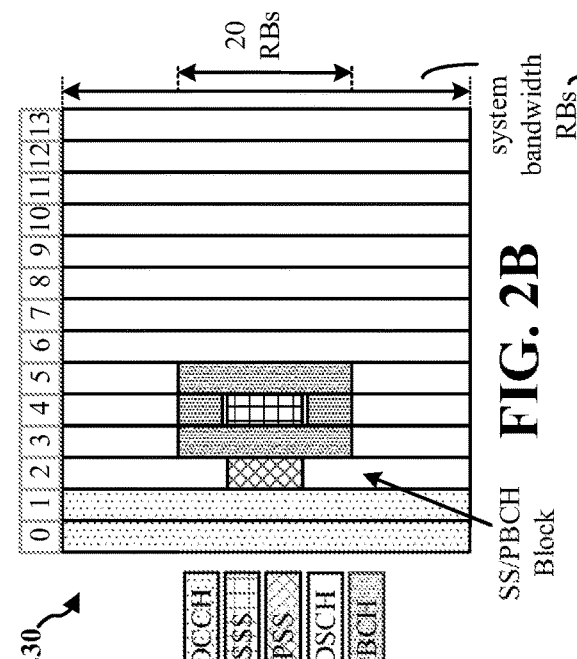
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2D:
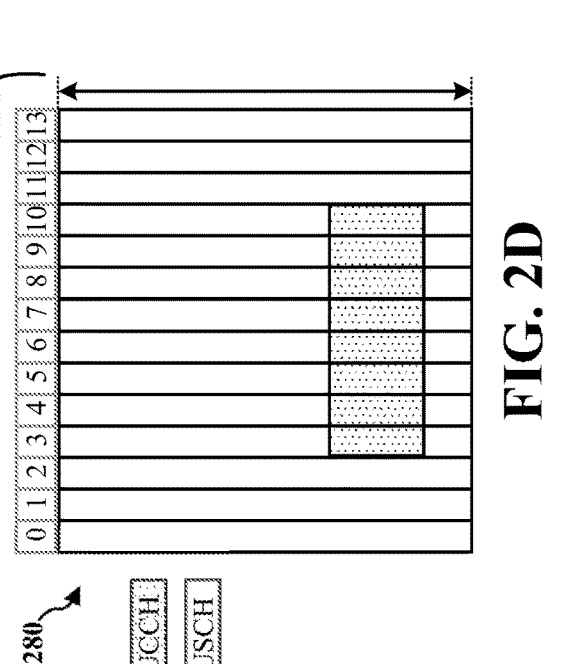
Figure 2A:
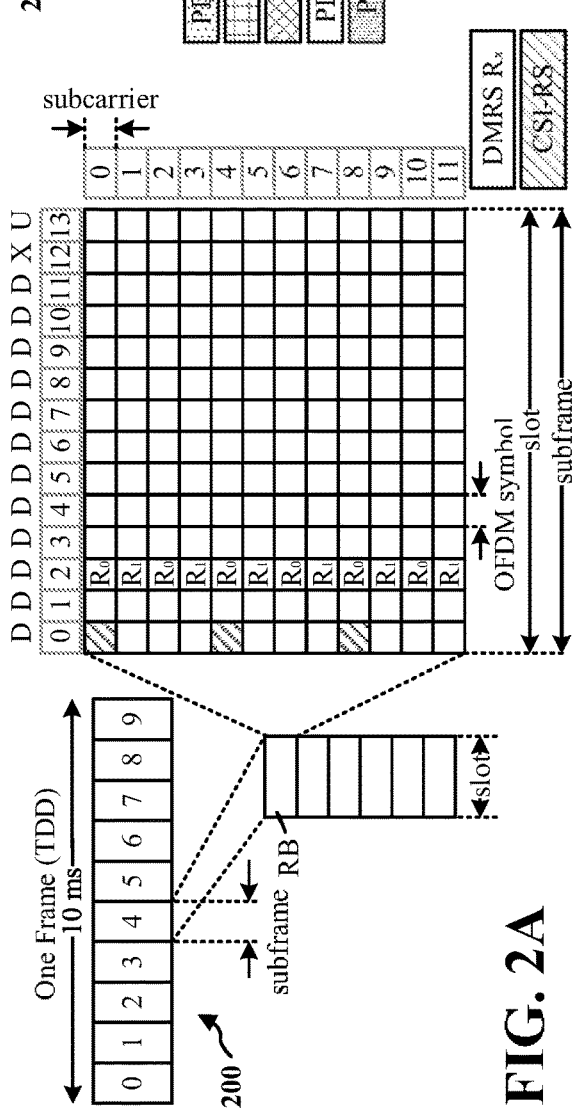
Figure 2C:
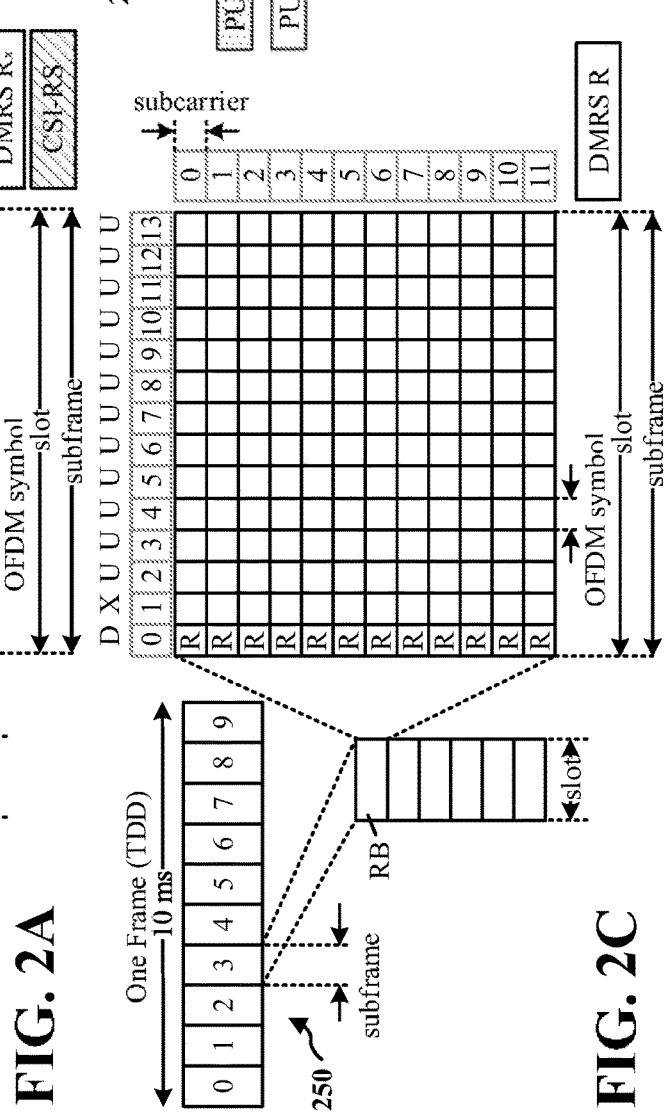

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
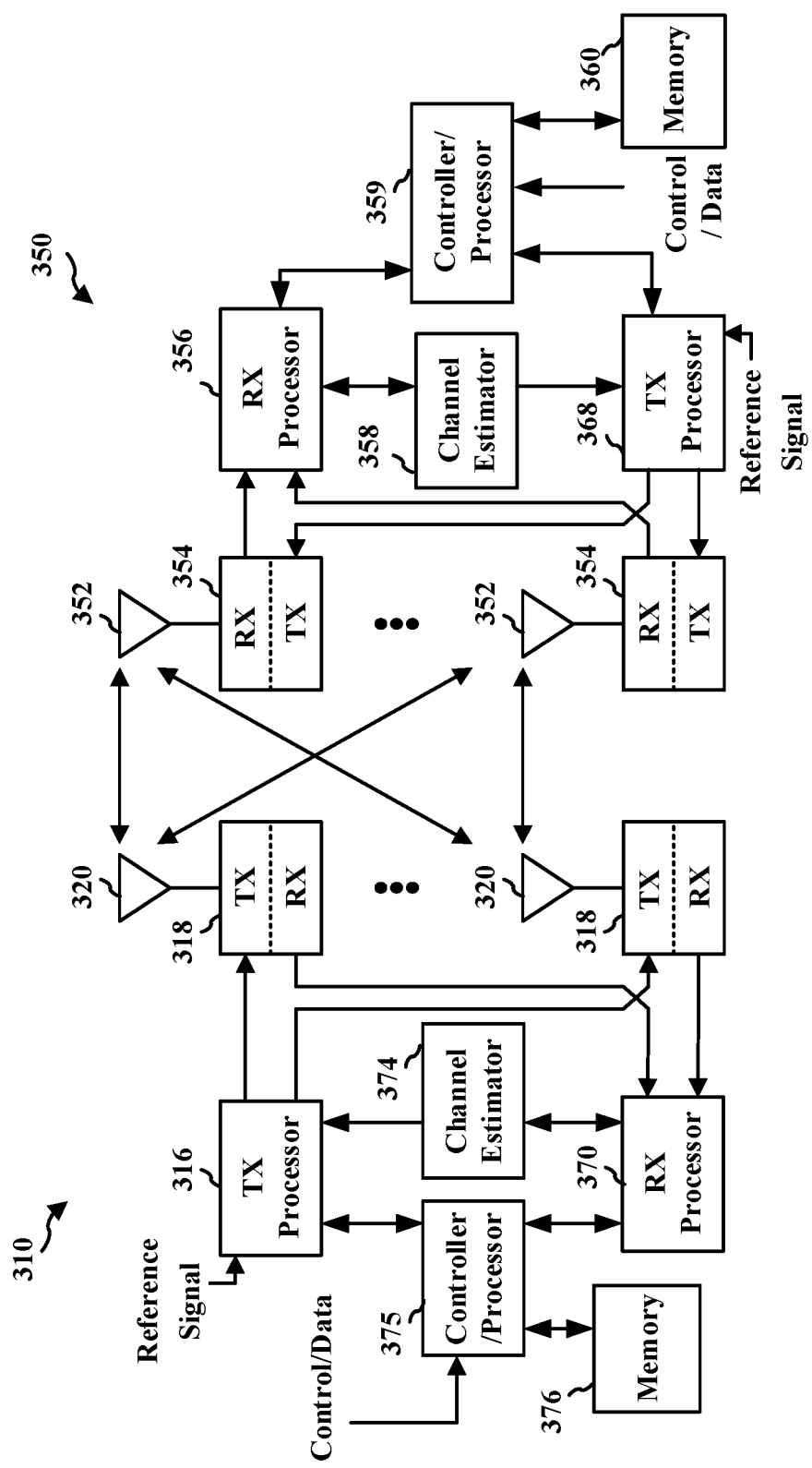
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 199 of FIG. 1.

In a communication system, such as a 5G NR system, there may be no prioritization rule assigned for SS-BFR. When a UE has overlapped search spaces (SSs) containing CORESETs with different quasi-co-located (QCL) TypeD, e.g., different beams, the UE may prioritize, a CORESET for a common search space (CSS) with a lowest ID in an active DL bandwidth part (BWP)(DL BWP) in serving cell with lowest cell index.

For a UE monitoring multiple search spaces associated with different CORESETs, the UE may monitor search spaces associated with a given CORESET containing a CSS in the active DL BWP in the serving cell with the lowest serving cell index and any other CORESET associated with the same QCL-TypeD properties as the given CORESET. For example, the UE may monitor search spaces associated with a given CORESET containing a CSS in the active DL BWP in the serving cell with the lowest serving cell index and any other CORESET associated with the same QCL-TypeD properties as the given CORESET for single cell operation or for operation with carrier aggregation in a same frequency band.

The UE may monitor search spaces associated with a given CORESET containing a CSS in the active DL BWP in the serving cell with the lowest serving cell index and any other CORESET associated with the same QCL-TypeD properties as the given CORESET when monitoring occasions of the search space are overlapped in time, and the search spaces are associated with different CORESETs having different QCL-TypeD properties. When two or more CORESETs both contain CSS, the UE selects the CORESET containing the search space having the lowest ID in the monitoring occasions in the active DL BWP in the serving cell with the lowest serving cell index. Any overlapped search space(s) associated with CORESETs having the same QCL-TypeD may be monitored. The UE may refrain from monitoring the other overlapping CORESET/search space.

When none of the CORESETs contain CSS, the UE may select the CORESET containing the search space having the lowest ID in the monitoring occasions in the active DL BWP in the serving cell with the lowest serving cell index. Any overlapped search space(s) associated with CORESETs having the same QCL-TypeD may be monitored. The UE may refrain from monitoring the other overlapping CORESET(s)/search space(s). For overlapped search space(s) associated with CORESETs having the same QCL-TypeD, QCL TypeD with respect to an SSB and QCL TypeD with respect to a CSI-RS (or a tracking reference signal (TRS)) may be considered as different QCL TypeD, even when the CSI-RS is sourced from the same synchronization signal block (SSB).

In an aspect, a UE may need to monitor all previously configured search spaces during a beam failure recovery period. A beam failure recovery period may be defined as a time after the UE sends a beam failure recovery request (BFRQ) to a base station and (1) before receiving a BFR response from the base station, (2) before receiving a medium access control (MAC) Control Element (CE)(MAC CE) activation command for a transmission configuration indication (TCI) state from the base station, or (3) before receiving an RRC reconfiguration for a TCI state, e.g. before receiving higher layer parameters: TCI-StatesPDCCH-ToAddlist and/or TCI-StatesPDCCH-ToReleaseList from the base station.

During the beam failure recovery period, an SS-BFR time occasion and/or CORESET for BFR (CORESET-BFR) may overlap with another previously configured SS occasion, e.g., both may happen in a first symbol of a slot. Based on the CORESET prioritization, when another CORESET/search space that is not for BFR has lowest CORESET ID/SS ID, the UE will prioritize receiving the CORESET/search space with the lowest CORESET ID/SS ID and drop the CORESET/search space for BFR. Accordingly, the UE may miss the CORESET-BFR response from the base station.

Aspects presented herein may enable the base station to transmit the BFR response in a CORSET/search space that will be monitored by the UE. The base station may prioritize PDCCH transmitted on SS-BFR. For example, a CORESET-BFR may be assigned with a lowest CORESET identifier (ID), and/or an SS-BFR may be assigned with a lowest search space ID. Using a lowest CORESET ID, and/or a lowest search space ID for an SS-BFR enables the UE to monitor for a BFR response even when an SS-BFR/CORESET-BFR is fully or partially overlapped with other SSs/CORESETs.

In a bandwidth part (BWP) with a control resource set 0 (CORESET 0) configured, CORESET 0 may be assigned as a CORESET-BFR. Thus, the base station may use CORESET 0 to send a BFR response to a UE. In a BWP without a CORESET 0 configured, a CORESET-BFR may be assigned to a lowest CORESET ID that is configured for the BWP, and/or a CORESET-BFR associated an SS may be assigned with lowest search space ID configured for the BWP.

Figure 4:
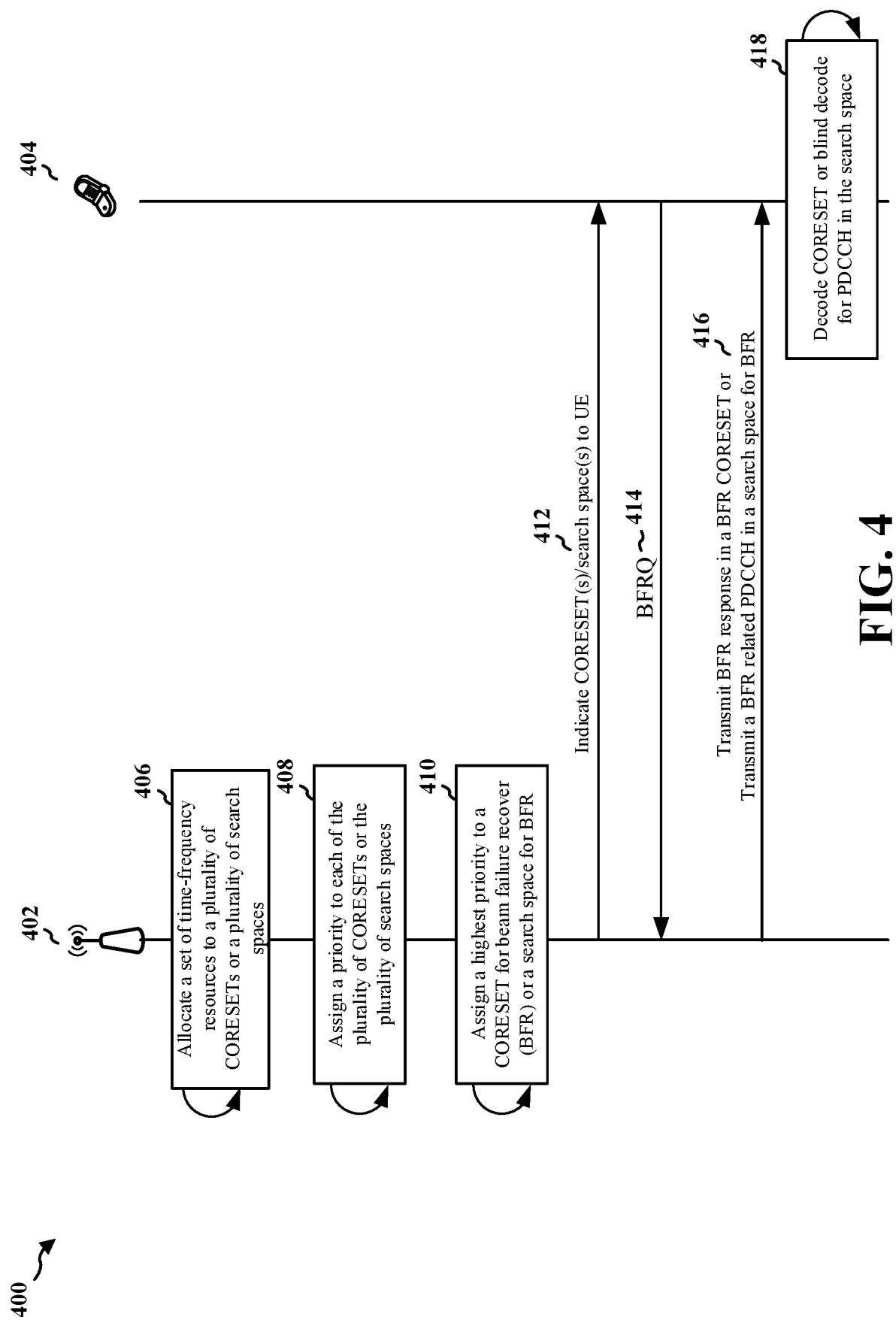
FIG. 4 is a signal flow diagram illustrating processing and signal transmission between a base station and a UE.

FIG. 4 is a signal flow diagram 400 illustrating processing at a base station 402 and a UE 404, and signal transmission between a base station 402 and a UE 404. The base station 402 may allocate a set of time-frequency resources to a plurality of a CORESETs and/or a plurality of search spaces 406. The CORESETs may be made up of multiples resource blocks in the frequency domain and a number of OFDM symbols in the time domain. The CORESET may be resource blocks/OFDM symbols that provide control information from the base station 402 to the UE 404. The SS may be a portion of a downlink resource grid, e.g., time-frequency resources, where a PDCCH may be carried, allowing a UE 404 to perform blind decoding throughout the search space to attempt to find PDCCH data.

The base station 402 may assign a priority to each of the plurality of CORESETs or the plurality of search spaces 408. The plurality of CORESETs or the plurality of SSs may made up of multiple time-frequency resources. Thus, each of the plurality of CORESETs or the plurality of SSs may be assigned a priority. In other words, different time-frequency resources assigned to the plurality of CORESETs or the plurality of SSs may be assigned different priorities. Assigning the priority may include assigning an index or ID to each of the plurality of CORESETs or the plurality of search spaces.

The base station 402 may assign a highest priority, e.g., a lowest index or ID, to a CORESET for BFR or a search space for BFR 410. Thus, a CORESET for BFR or a search space for BFR 410 may have a highest priority while a CORESET that is not for BFR or a search space that is not for BFR 410 may have a lower priority. Accordingly, a UE missing a CORESET-BFR response or a search space for BFR response might be avoided because the CORESET for BFR or a search space for BFR 410 may have a higher priority than a CORESET that is not for BFR or a search space that is not for BFR.

Assigning a highest priority to a CORESET for BFR or a search space for BFR may include reserving a lowest index for the CORESET for BFR or the search space for BFR. The time-frequency resources may be allocated for a plurality of CORESETS, wherein the base station 402 assigns the highest priority time-frequency resource to a CORESET for BFR. In an aspect, assigning a highest priority for the CORESET for BFR comprises assigning a lowest CORESET ID index to the CORESET for BFR, e.g. CORESET 0 or a lowest CORESET ID if CORESET 0 is not configured for the BWP. The set of time-frequency resources may be allocated for a plurality of search spaces, wherein the base station 402 assigns the highest priority to a search space for BFR. Assigning the highest priority to the search space for BFR may similarly comprise assigning a lowest search space identification (SS ID) index to the search space for BFR. The base station may indicate the CORESET(s)/search space(s) to the UE at 412. The UE may use the information received at 412 to determine whether an overlap occurs between CORESET(s)/search space(s). When the UE determines that an overlap occurs for CORESET(s)/search space(s) having different QCL-Type D properties, the UE may determine which CORESET/search space to monitor and which CORESET(s)/search space(s) should be dropped. If a beam failure is detected at the UE, the UE may send a BFRQ 414 to the base station and may monitor for a BFR response from the base station.

The base station may transmit BFR control information, e.g., a BFR response, in a BFR CORESET or transmit a BFR related PDCCH in a search space for BFR 416. The UE 404 may receive BFR control information in a BFR CORESET or receive a BFR related PDCCH in a search space for BFR 416. As the base station has assigned a highest priority, e.g., lowest CORESET ID/SS ID, to the CORESET-BFR/SS-BFR, the UE will monitor the CORESET-BFR/SS-BFR even if an overlap occurs with another CORESET/SS. Thus, the UE 404 may decode the BFR response in the CORESET-BFR or blind decode the BFR information in the search space-BFR 418.

Figure 5:
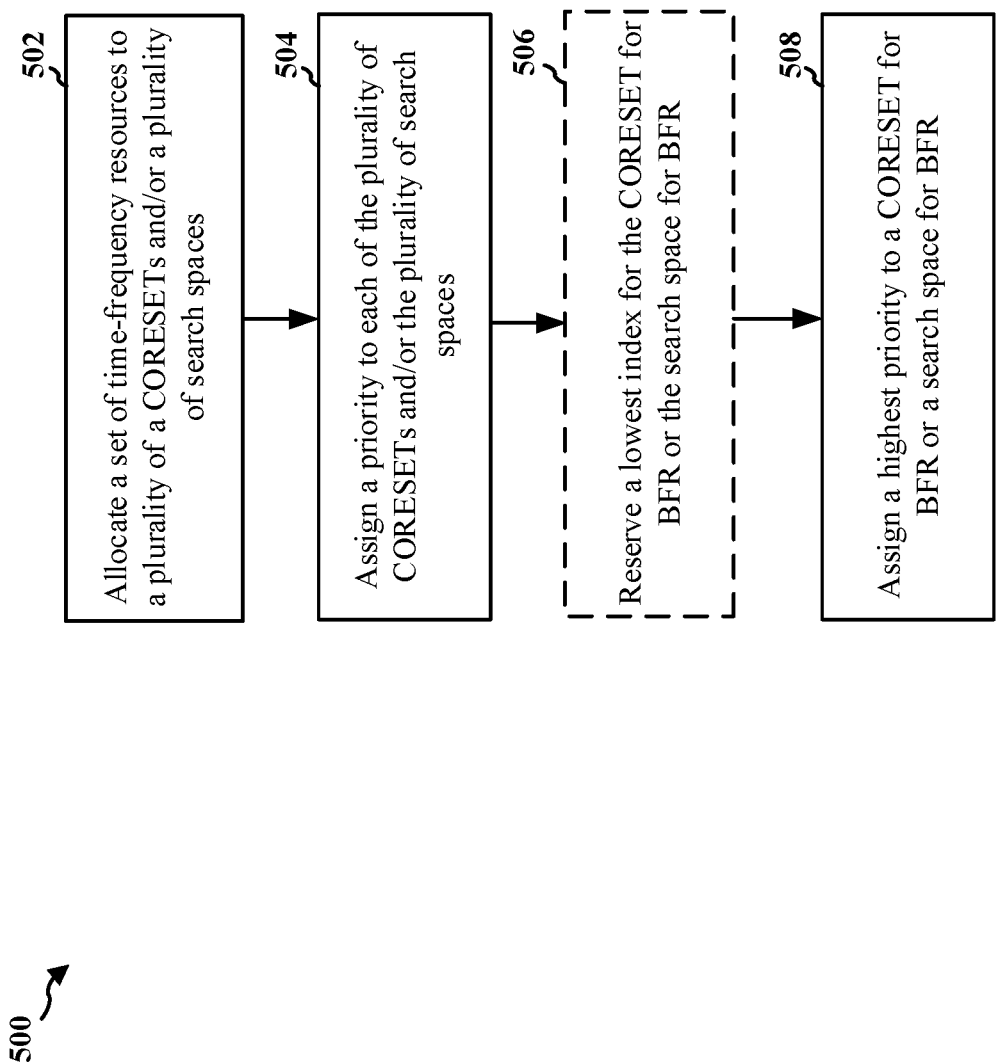
FIG. 5 is a flowchart of a method of wireless communication.

FIG. 5 is a flowchart 500 of a method of wireless communication. The method may be performed by a base station or a component of a base station (e.g., the base station 102, 180, 310, 402; the apparatus 602/602'; the processing system 714, which may include the memory 376 and which may be the entire base station 310 or a component of the base station 310, such as the TX processor 316, the RX processor 370, and/or the controller/processor 375). Optional aspects are illustrated with a dashed line. The method may allow the base station to assist a UE to avoid missing a BFR response due to an overlap between CORESETs or search spaces.

At 502, the base station may allocate a set of time-frequency resources to a plurality of a CORESETs and/or a plurality of search spaces. For example, 502 may be performed by the allocation component 606 of apparatus 602. In some aspects, the base station 102, 180, 310, 402, or the apparatus 602/602' may allocate a set of time-frequency resources for a plurality of CORESETs and/or a plurality of search spaces. In some aspects, the time-frequency resources may be allocated for a plurality of CORESETS. In some aspects, the set of time-frequency resources may be allocated for a plurality of search spaces.

As discussed above, the CORESETs may be made up of multiples resource blocks in the frequency domain and a number of OFDM symbols in the time domain. The CORESET may be resource blocks/OFDM symbols that provide control information from the base station 402 to the UE 404. The SS may be a portion of a downlink resource grid, e.g., time-frequency resources, where a PDCCH may be carried, allowing a UE 404 to perform blind decoding throughout the search space to attempt to find PDCCH data. In some aspects, allocating a set of time-frequency resources to a plurality of a CORESETs or a plurality of search spaces may include determining the set of time-frequency resources to use for the plurality of a CORESETs or the plurality of search spaces and keeping track of, e.g., storing information related to, the set of time-frequency resources to use for the plurality of a CORESETs or the plurality of search spaces.

At 504, the base station may assign a priority to each of the plurality of CORESETs and/or the plurality of search spaces. For example, 504 may be performed by priority component 608 of apparatus 602. In some aspects, the base station 102, 180, 310, 402, or the apparatus 602/602' may assign a priority to each of the plurality of CORESETs and/or the plurality of search spaces. As discussed above, the plurality of CORESETs and/or the plurality of SSs may be made up of multiple time-frequency resources that may be assigned different priorities. In some aspects, assigning a priority to each of the plurality of CORESETs or the plurality of search spaces may include determining a priority for each of the plurality of CORESETs or the plurality of search spaces and storing the priorities. In some aspects, assigning the priority may include assigning an index to each of the plurality of CORESETs or the plurality of search spaces. Thus an index number may be stored that is related to each of the plurality of CORESETs or the plurality of search spaces. The index may also be provided to the UE when the CORESETs and/or search spaces are indicated to the UE.

At 508, the base station may assign a highest priority to a CORESET for BFR or a search space for BFR. For example, 508 may be performed by BFR component 610 of apparatus 602. In some aspects, the base station 102, 180, 310, 402, or the apparatus 602/602' may assign a highest priority to a CORESET for BFR or a search space for BFR. Thus, a CORESET for BFR or a search space for BFR 410 may have a highest priority while a CORESET that is not for BFR or a search space that is not for BFR may have a lower priority. Accordingly, a UE can avoid missing a BFR response signaled from the base station in the CORESET for BFR or the search space for BFR even when there is an overlap between multiple CORESETs/search spaces. The UE can avoid missing the BFR response, because the CORESET for BFR or a search space for BFR 410 has a higher priority than a CORESET that is not for BFR or a search space that is not for BFR. In an aspect, assigning a highest priority to a CORESET for BFR or a search space for BFR may include determining the CORESET for BFR or the search space for BFR and allocating a lowest index or ID to the CORESET for BFR or the search space for BFR. For example, in a BWP having CORESET 0 configured, CORESET 0 may be used as the CORESET-BFR to send a BFR response from the base station to the UE. In a BWP that does not have CORESET 0 configured, the CORESET for BFR may be assigned with the lowest CORESET ID and/or an associated search space having a lowest search space ID. As well, the base station may dedicate a CORESET/search space for BFR individually for each UE communicating with the base station. Although 504 and 508 in FIG. 5 are illustrated as separate steps, it will be understood that, in some aspects, assigning a highest priority to a CORESET for BFR or a search space for BFR (508) may occur at the same time as or as part of assigning a priority to each of the plurality of CORESETs and/or the plurality of search spaces (504).

In some aspects, the time-frequency resource may be allocated for a plurality of CORESETS, such that the base station 102, 180, 310, 402, or the apparatus 602/602' may assign the highest priority time-frequency resource to a CORESET for BFR. In some aspects, assigning a highest priority for the CORESET for BFR may include assigning a lowest CORESET ID index to the CORESET for BFR, e.g., CORESET 0 or a lowest CORESET ID configured for the BWP. In some aspects, the base station 102, 180, 310, 402, or the apparatus 602/602' may allocate the set of time-frequency resources for a plurality of search spaces, such that the base station assigns the highest priority to a search space for BFR. In some aspects, assigning the highest priority to the search space for BFR may comprise assigning a lowest search space identification (SS ID) index to the search space for BFR.

In some aspects, for example as illustrated at 506, the base station may reserve a lowest index CORESET or search space for the CORESET for BFR or the search space for BFR. For example, 506 may be performed by reservation component 609 of apparatus 602. For example, the base station 102, 180, 310, 402, or the apparatus 602/602' may reserve CORESET 0 or a lowest configured CORESET ID within a BWP for the CORESET for BFR or the search space for BFR. In an aspect, reserving the lowest index for the CORESET for BFR or the search space for BFR may include selecting which index value is the lowest index value and only assigning that index value for the CORESET for BFR or the search space for BFR.

The base station may use the CORESET/search space for BFR to transmit a BFR response in response to a BFR message received from a UE.

Figure 6:
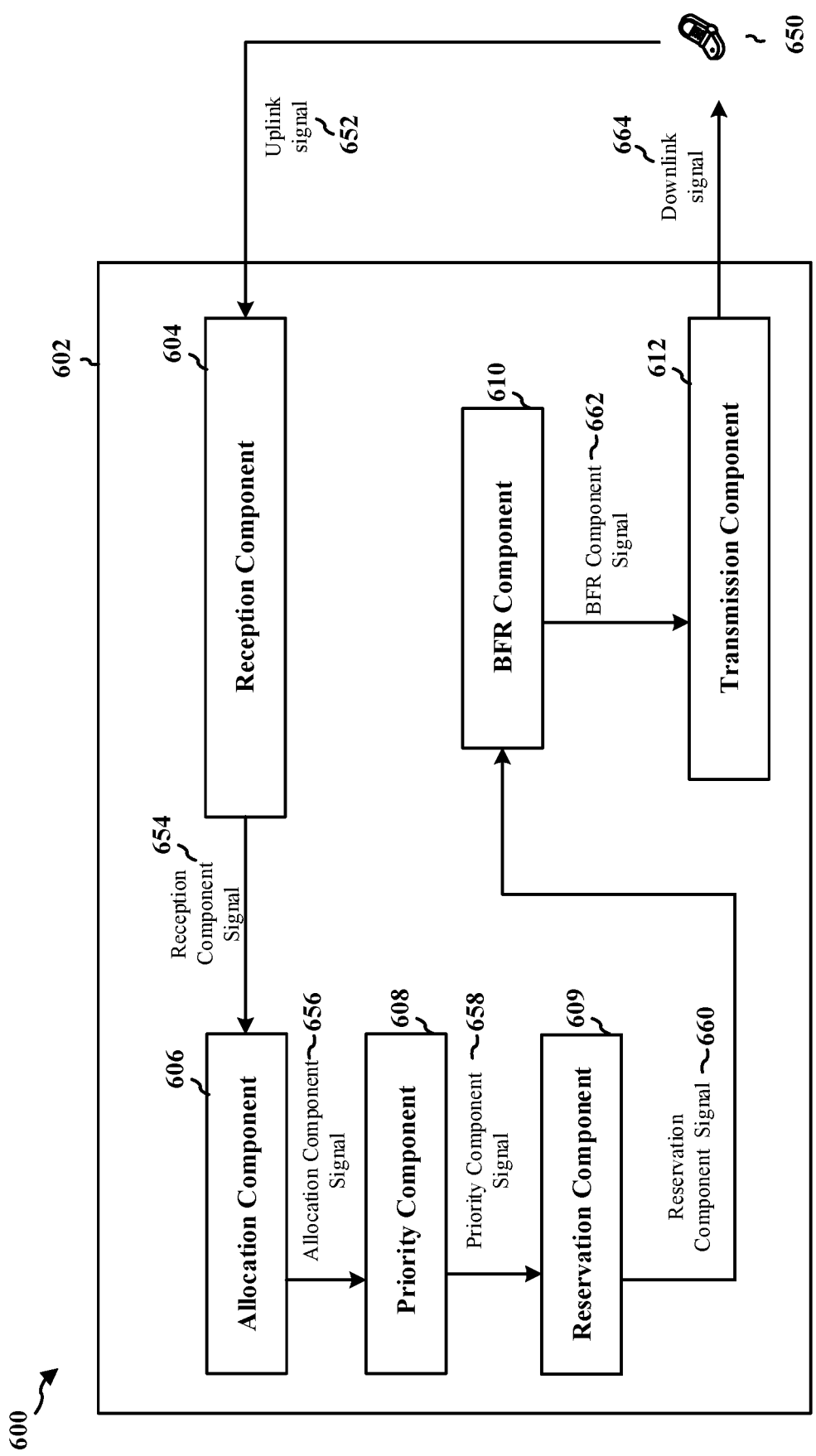
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a base station or a component of a base station (e.g., base station 102, 180, 310, 402). Alternatively, the apparatus may be a component of a base station. The apparatus includes a reception component 604 that receives uplink signals 652 from a UE 650, and a transmission component 612 that transmits downlink signals 664 to the UE. The apparatus may include an allocation component 606 that may be configured to allocate a set of time-frequency resources to a plurality of a CORESETs or a plurality of search spaces, e.g., as described in connection with 502 of FIG. 5. The apparatus includes a priority component 608 that may be configured to assign a priority to each of the plurality of CORESETs or the plurality of search spaces, e.g., as described in connection with 504 of FIG. 5. The apparatus may further include a BFR component 610 that may be configured to assign a highest priority to a CORESET for BFR or a search space for BFR, e.g., as described in connection with 508 of FIG. 5. The priority component 608 and/or the BFR component 610 may be configured to reserve a lowest index for the CORESET for BFR or the search space for BFR, e.g., as described in connection with 506 of FIG. 5. In some aspects, the apparatus includes a reservation component 609 that may be configured to reserve the lowest index for the CORESET for BFR or the search space for BFR, e.g., as described in connection with 506 of FIG. 5. The allocation component 606 may receive a reception component signal 654 from the reception component 604. The reception component signal 654 may provide an indication, to the allocation component 606, that the allocation component 606 may allocate a set of time-frequency resources to a plurality of a CORESETs or a plurality of search spaces. An allocation component signal 656 from the allocation component 606 may provide an indication, to the priority component 608, that the priority component 608 may assign a priority to each of the plurality of CORESETs or the plurality of search spaces. A priority component signal 658 may cause the BFR component 610 to assigns a highest priority to a CORESET for BFR or a search space for BFR. A reservation component signal 660 from the reservation component 609 may provide an indication that the lowest index for CORESET for BFR or the search space for BFR has been reserved. A BFR component signal 662 may cause the transmission component 612 to transmit the downlink signal 664 to the UE 650, e.g., to indicate the CORESET(s) and/or search space(s) to the UE 650. The UE 650 may respond with a BFRQ using the signal 652 which may cause the transmit component 612 to transmit BFR response in a BFR CORESET or transmit a BFR related PDCCH in a search space for BFR.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
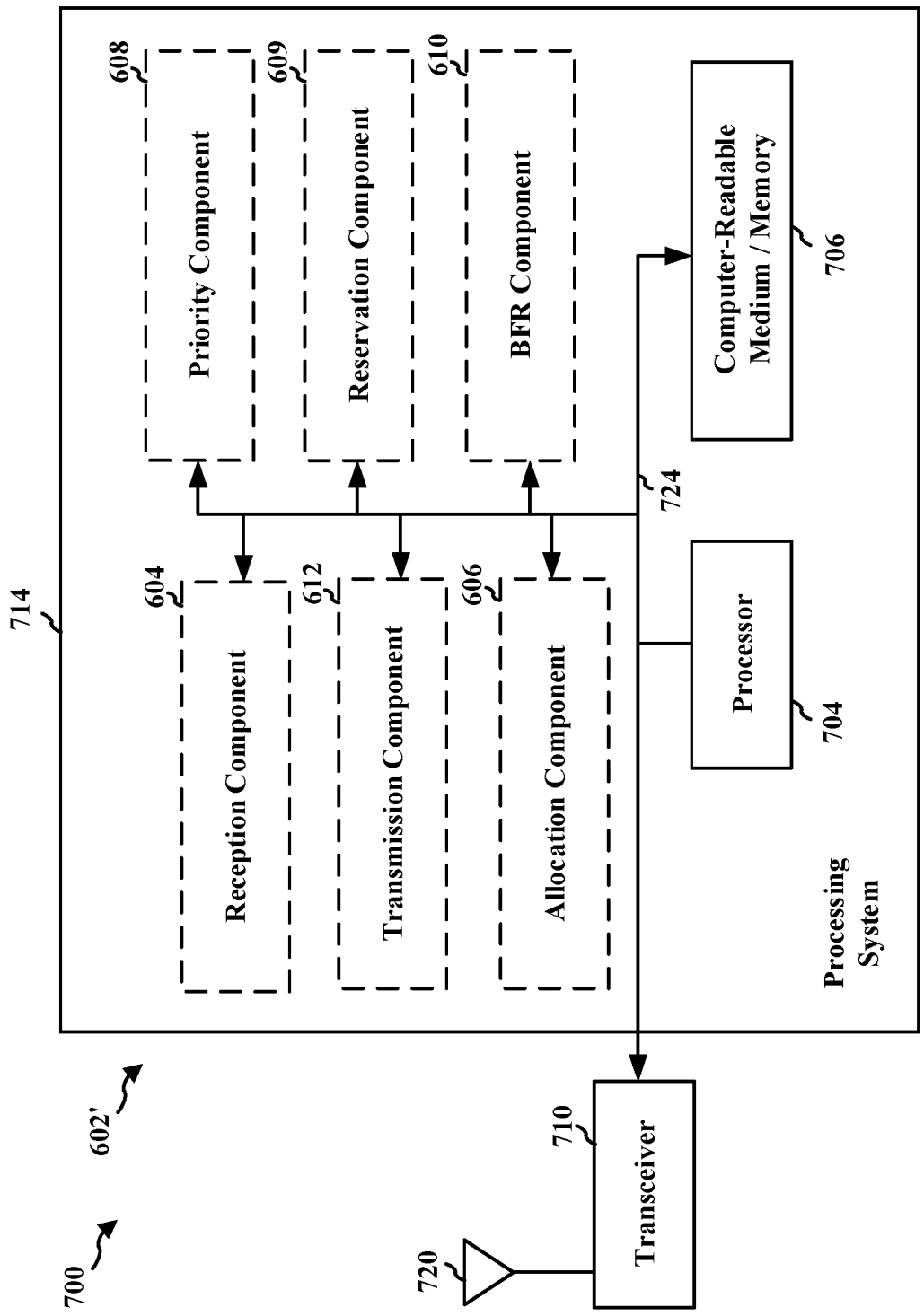
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 609, 610, 612, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604 may receive signals 652 from the UE 650. When a beam failure occurs, the reception component 604 may fail to receive signals 652 from the UE 650. In addition, the transceiver 710 receives information from the processing system 714, specifically the transmission component 612 may transmit signals 664 to the UE 650, and based on the received information, generates a signal to be applied to the one or more antennas 720. When a beam failure occurs, the UE 650 may fail to receive signals 664 from the transmission component 612 of the apparatus 602. As part of beam recovery, the transmit component 612 may transmit BFR control information in a BFR CORESET or transmit a BFR related PDCCH in a search space for BFR. The transmit BFR control information in the BFR CORESET or the BFR related PDCCH in a search space for BFR may be received by the UE 650 over signals 664.

The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 609, 610, 612. The components may be software components running in the processor 704, resident/stored in the computer-readable medium/memory 706, one or more hardware components coupled to the processor 704, or some combination thereof. The processing system 714 may be a component of the base station 310 and may include the memory 376 and/or at least one of the TX processor 316, the RX processor 370, and the controller/processor 375. Alternatively, the processing system 714 may be the entire base station (e.g., see 310 of FIG. 3).

In one configuration, the apparatus 602/602' for wireless communication includes means for allocating a set of time-frequency resources to a plurality of a CORESETs or a plurality of search spaces. The apparatus includes means for assigning a priority to each of the plurality of CORESETs or the plurality of search spaces. The apparatus includes means for assigning a highest priority to a CORESET for BFR or a search space for BFR. The apparatus further includes means for reserving a lowest index for the CORESET for BFR or the search space for BFR. The aforementioned means may be one or more of the aforementioned components of the apparatus 602 and/or the processing system 714 of the apparatus 602' configured to perform the functions recited by the aforementioned means. As described supra, the processing system 714 may include the TX Processor 316, the RX Processor 370, and the controller/processor 375. As such, in one configuration, the aforementioned means may be the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

As described herein, a base station 102, 180, 310, 402, or the apparatus 602/602' may assign a highest priority to a CORESET for BFR or a search space for BFR 410 such that the CORESET for BFR or a search space for BFR may have a highest priority while a CORESET that is not for BFR or a search space that is not for BFR 410 may have a lower priority. Accordingly, the UE missing the CORESET-BFR response might be avoided because the CORESET for BFR or a search space for BFR 410 has a higher priority. At least one advantage of the disclosure is that the base station may assist a UE to avoid missing a BFR response due to an overlap between CORESETs or search spaces. For example, a UE may avoid missing a BFR response, due to the CORESET for BFR or a search space for BFR having a higher priority than a CORESET that is not for BFR or a search space that is not for BFR.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a base station, the method comprising:
    allocating a set of time-frequency resources to a plurality of control resource sets (CORESETs) or a plurality of search spaces;
    assigning a priority to each of the plurality of CORESETs or the plurality of search spaces;
    assigning a highest priority to a CORESET for beam failure recovery (BFR) or a search space for BFR;
    determining which index is a lowest control resource set identification (CORESET ID) index or a lowest search space identification (SS ID) index configured within an active downlink bandwidth part (DL BWP) for a user equipment (UE) that is served by the base station;
    reserving the lowest CORESET ID index or the lowest SS ID index of the active DL BWP for the CORESET for BFR or the search space for BFR; and
    indicating, to the UE, the CORESET for BFR having the lowest CORESET ID index or the search space for BFR having the lowest SS ID index.

2. The method of claim 1, wherein assigning the priority comprises assigning an index to each of the plurality of CORESETs or the plurality of search spaces.

3. The method of claim 1, wherein the set of time-frequency resources are allocated for the plurality of CORESETS, wherein the base station assigns a highest priority time-frequency resource to the CORESET for BFR.

4. The method of claim 3, wherein assigning the highest priority for the CORESET for BFR comprises assigning the lowest CORESET ID index to the CORESET for BFR.

5. The method of claim 1, wherein the set of time-frequency resources are allocated for the plurality of search spaces, wherein the base station assigns the highest priority to the search space for BFR.

6. The method of claim 5, wherein assigning the highest priority to the search space for BFR comprises assigning the lowest SS ID index to the search space for BFR.

7. An apparatus for wireless communication, comprising:
    means for allocating, by a processor, a set of time-frequency resources to a plurality of a control resource sets (CORESETs) or a plurality of search spaces;

means for assigning, by the processor, a priority to each of the plurality of CORESETs or the plurality of search spaces;

means for assigning, by the processor, a highest priority to a CORESET for beam failure recovery (BFR) or a search space for BFR;

means for determining which index is a lowest control resource set identification (CORESET ID) index or a lowest search space identification (SS ID) index configured within an active downlink bandwidth part (DL BWP) for a user equipment (UE) that is served by the apparatus;

means for reserving, by the processor, the lowest CORESET ID index or the lowest SS ID index of the active DL BWP for the CORESET for BFR or the search space for BFR; and means for indicating, by the processor to the UE, the CORESET for BFR having the lowest CORESET ID index or the search space for BFR having the lowest SS ID index.

8. The apparatus of claim 7, wherein assigning the priority comprises assigning an index to each of the plurality of CORESETs or the plurality of search spaces.

9. The apparatus of claim 7, wherein the set of time-frequency resources are allocated for the plurality of CORESETS, wherein the apparatus assigns a highest priority time-frequency resource to the CORESET for BFR.

10. The apparatus of claim 9, wherein assigning the highest priority for the CORESET for BFR comprises assigning the lowest CORESET ID index to the CORESET for BFR.

11. The apparatus of claim 7, wherein the set of time-frequency resources are allocated for the plurality of search spaces, wherein the apparatus assigns the highest priority to the search space for BFR.

12. The apparatus of claim 11, wherein assigning the highest priority to the search space for BFR comprises assigning the lowest SS ID index to the search space for BFR.

13. The apparatus of claim 7, wherein the apparatus comprises a base station.

14. An apparatus for wireless communication, comprising:
   a memory; and
   at least one processor coupled to the memory and configured to:
      allocate a set of time-frequency resources to a plurality of a control resource sets (CORESETs) or a plurality of search spaces;
      assign a priority to each of the plurality of CORESETs or the plurality of search spaces;
      assign a highest priority to a CORESET for beam failure recovery (BFR) or a search space for BFR;
      determine which index is a lowest control resource set identification (CORESET ID) index or a lowest search space identification (SS ID) index configured within an active downlink bandwidth part (DL BWP) for a user equipment (UE) that is served by the apparatus;
      reserve the lowest CORESET ID index or the lowest SS ID index of the active DL BWP for the CORESET for BFR or the search space for BFR; and
      indicate, to the UE, the CORESET for BFR having the lowest CORESET ID index or the search space for BFR having the lowest SS ID index.

15. The apparatus of claim 14, wherein assigning the priority comprises assigning an index to each of the plurality of CORESETs or the plurality of search spaces.

16. The apparatus of claim 14, wherein the set of time-frequency resources are allocated for the plurality of CORESETS, wherein the apparatus assigns a highest priority time-frequency resource to the CORESET for BFR.

17. The apparatus of claim 16, wherein assigning the highest priority for the CORESET for BFR comprises assigning the lowest CORESET ID index to the CORESET for BFR.

18. The apparatus of claim 17, wherein assigning the highest priority to the search space for BFR comprises assigning the SS ID index to the search space for BFR.

19. The apparatus of claim 14, wherein the set of time-frequency resources are allocated for the plurality of search spaces, wherein the apparatus assigns the highest priority to the search space for BFR.

20. The apparatus of claim 14, wherein the apparatus comprises a base station.

21. A non-transitory computer-readable medium storing computer executable code, comprising code to:
   allocate a set of time-frequency resources to a plurality of a control resource sets (CORESETs) or a plurality of search spaces;
   assign a priority to each of the plurality of CORESETs or the plurality of search spaces;
   assign a highest priority to a CORESET for beam failure recovery (BFR) or a search space for BFR;
   determine which index is a lowest control resource set identification (CORESET ID) index or a lowest search space identification (SS ID) index configured within an active downlink bandwidth part (DL BWP) for a user equipment (UE) that is served by a base station;
   reserve the lowest CORESET ID index or the lowest SS ID index of the active DL BWP for the CORESET for BFR or the search space for BFR; and
   indicate, to the UE, the CORESET for BFR having the lowest CORESET ID index or the search space for BFR having the lowest SS ID index.

22. The non-transitory computer-readable medium of claim 21, wherein assigning the priority comprises assigning an index to each of the plurality of CORESETs or the plurality of search spaces.

23. The non-transitory computer-readable medium of claim 21, wherein the set of time-frequency resources are allocated for the plurality of CORESETS, wherein the non-transitory computer-readable medium comprises code to assign a highest priority time-frequency resource to the CORESET for BFR.

24. The non-transitory computer-readable medium of claim 23, wherein assigning the highest priority for the CORESET for BFR comprises assigning the lowest CORESET ID index to the CORESET for BFR.

25. The non-transitory computer-readable medium of claim 21, wherein the set of time-frequency resources are allocated for the plurality of search spaces, wherein the non-transitory computer-readable medium comprises code to assign the highest priority to the search space for BFR.

26. The non-transitory computer-readable medium of claim 25, wherein assigning the highest priority to the search space for BFR comprises assigning the lowest SS ID index to the search space for BFR.

* * * * *